US012695351B2

(12) United States Patent
Eppel et al.

(10) Patent No.: US 12,695,351 B2
(45) Date of Patent: Jul. 28, 2026

(54) SEALING ARRANGEMENT AND DRIVE UNIT INCLUDING A SEALING ARRANGEMENT

(71) Applicant: Robert Bosch GmbH, Stuttgart (DE)

(72) Inventors: Klaus Eppel, Lauf (DE); Matthias Baumann, Lahr (DE)

(73) Assignee: Robert Bosch GmbH, Stuttgart (DE)

( * ) Notice: Subject to any disclaimer, the term of this patent is extended or adjusted under 35 U.S.C. 154(b) by 325 days.

(21) Appl. No.: 18/464,479

(22) Filed: Sep. 11, 2023

(65) Prior Publication Data

US 2024/0106297 A1     Mar. 28, 2024

(30) Foreign Application Priority Data

Sep. 22, 2022    (DE) ..................... 10 2022 210 006.9

(51) Int. Cl.
*H02K 5/10*            (2006.01)
*F16J 15/32*           (2016.01)
(52) U.S. Cl.
CPC ................ *H02K 5/10* (2013.01); *F16J 15/32* (2013.01)
(58) Field of Classification Search
CPC ...... H02K 5/10; H02K 11/33; H02K 2203/03; F16J 15/32; F16J 15/106; F16J 15/062
See application file for complete search history.

(56) References Cited

U.S. PATENT DOCUMENTS

| | | | |
|---|---|---|---|
| 2,841,429 A | | 7/1958 | McCuistion |
| 2,954,264 A | * | 9/1960 | Tisch ........................ F16J 15/32 |
| | | | 277/630 |
| 2,983,533 A | | 5/1961 | Tisch |
| 3,052,478 A | | 9/1962 | Horvereid |
| 4,015,883 A | | 4/1977 | Taylor |

FOREIGN PATENT DOCUMENTS

| | | | |
|---|---|---|---|
| DE | | 1750946 A1 | 11/1971 |
| DE | 10 2005 004 323 A1 | | 9/2006 |

* cited by examiner

*Primary Examiner* — Tulsidas C Patel
*Assistant Examiner* — Mohammed Ahmed Qureshi
(74) *Attorney, Agent, or Firm* — Maginot, Moore & Beck LLP

(57)     ABSTRACT

A sealing arrangement for sealing a first housing part with respect to a second housing part is arranged in an annular groove between the two housing parts. The sealing ring has a cross-section which abuts in a central area as an O-ring on opposite sides on the two housing parts. In addition, the cross-section has at least two sealing ears which extend from the central area of the cross-section into corners of the annular groove.

20 Claims, 3 Drawing Sheets

SEALING ARRANGEMENT AND DRIVE UNIT INCLUDING A SEALING ARRANGEMENT

This application claims priority under 35 U.S.C. § 119 to application no. DE 10 2022 210 006.9, filed on Sep. 22, 2022 in Germany, the disclosure of which is incorporated herein by reference in its entirety.

The disclosure relates to a sealing arrangement, as well as a drive unit having the sealing arrangement.

BACKGROUND

U.S. Pat. No. 4,015,883 discloses a sealing element arranged between an outer and an inner ring of a ball bearing to seal the rolling elements of the bearing against the surrounding. The sealing element is designed as a rotary shaft sealing ring, which is supported on the outer bearing ring by an outer radial sealing surface and which abuts on the bearing inner part, for example a rotatable shaft, by an inner radial sealing lip on the opposite side.

DE 10 2005 004 323 A1 shows a drive unit in which a sealing element seals a housing part on the one hand against a rotatable shaft, and on the other hand axially against a housing cover. In a first version, the axial seal is designed as an O-ring with an oval cross-section, and in a second version it is designed as axial lip seals, each with two sealing lips arranged next to each other. With such designs, there is a risk of crevice corrosion occurring between the housing parts, which infiltrates the sealing lips. The sealing arrangement according to the disclosure is intended to at least reduce such crevice corrosion.

SUMMARY

The sealing arrangement according to the disclosure, as well as a drive unit having such a sealing arrangement, has the advantage that due to the design of the seal in the manner of an O-ring, it can be manufactured very inexpensively, without complex tolerance requirements, as would be necessary with a pure lip seal. As a result, the design of the grouting of the actual primary pressure-sealing element can be performed according to common standards using simple design tools, and does not require complex simulations, as is the case, for example, with complex multi-lip seals. By molding sealing ears onto the O-ring, the gaps in the sealing groove can be effectively sealed, which can reduce infiltration of the seal due to corrosion. This ring seal allows a design of the interface between two housing parts to be selected that reduces capillary effects and geometrically allows accelerated drying of the remaining gaps or voids.

The features set forth below enable advantageous further embodiments of the devices according to the disclosure. If a total of four sealing ears are formed onto the central area of the sealing cross-section, each extending into a corner of the sealing groove, it can be ensured that all corners of the annular groove, and thus also the joint gap between two adjacent housing parts, are reliably sealed. Here, the design of the cross-section of the sealing ring fills the annular groove to a large extent, so that voids for moisture accumulation are significantly reduced.

The sealing ears of the sealing ring are dimensioned in such a way that the outer contour of one sealing ear simultaneously abuts on two inner walls of the sealing groove, which are arranged transversely to each other. This allows a joint gap at one corner of the sealing groove to be effectively sealed against moisture.

The design of the sealing cross-section with a central O-ring and the sealing ears formed thereon allows three sealing barriers arranged in sequence to be arranged within the annular groove in the direction of the joint gap—where moisture wants to penetrate. In this case, the sealing ring in the central area of the O-ring has a similar diameter in the sealing direction as the dimensions between two outer surfaces of two sealing ears opposite each other in the sealing direction. As a result, the ring seal at all three sealing barriers is in contact with the corresponding housing parts with approximately sufficient sealing force.

In this case, the sealing ring is particularly advantageously formed from an elastic rubber material or an elastomer, which can be produced very cost effectively by injection molding with any desired cross-section.

Preferably, the annular groove is formed completely in the first or in the second housing part, wherein the annular groove has a smaller extension in the direction of the contact pressure than transversely to the contact pressure or transversely to the sealing direction. In particular, this allows three sealing barriers to be arranged transversely to the sealing direction in order to at least delay corrosive infiltration of the ring seal.

To enable rapid drying and good ventilation of the annular groove, the sealing geometry can be designed in a particularly favorable manner in such a way that a free space or widening of the joint gap is formed between the two housing parts on the side facing the surrounding of the housing. This prevents a capillary effect outside the annular groove—and thus a buildup of liquid in the joint gap. This free space and/or widening preferably extends from the outer surrounding exactly to the beginning of the sealing groove, wherein the sealing groove is then sealed internally by the corresponding sealing ear.

In this case, it is sufficient if the second housing part covers the annular groove exactly, without the second housing part having to lie close to the first housing part on the side of the annular groove facing the surrounding.

For example, a housing part can have an assembly chamfer by means of which this housing part is pushed over the sealing ring. The mounting chamfer presses the unloaded sealing ring into the annular groove in the sealing direction, so that the ring seal is reliably pressed inside the annular groove once mounting is complete.

The shape and dimensions of the cross-section of the sealing ring are selected in such a way that it largely fills the profile of the annular groove after finished assembly—for example, about 70% at room temperature. Thus, possible moisture accumulation inside the annular groove is considerably reduced, which at least delays seal infiltration caused by corrosion.

The sealing arrangement according to the disclosure is particularly suitable for a drive unit in which two cylindrical ends of two housing parts are joined together. The ring seal according to the disclosure is inserted into a corresponding annular groove in at least one of the housing parts and pressed against the housing part on the opposite side. This also prevents the seal from being infiltrated by crevice corrosion and moisture from entering the interior of the housing over a longer service life. The sealing arrangement is particularly suitable for a motor housing in which the ring seal is arranged closed circumferentially around a rotor shaft and/or the stator.

According to a first embodiment, the sealing arrangement can be designed to seal radially, in which the sealing ring is loaded with pressure in the radial direction, transverse to the motor axis. In the radial seal, for example, the annular groove is formed on a cylindrical surface of the first housing part, wherein a sleeve-shaped wall of the other housing part is pushed on in the axial direction. In this case, the radially open annular groove is completely covered in the axial direction by the sleeve-shaped wall of the other housing part, with an insertion chamfer formed on the housing part preferably pressing the sealing ring into the annular groove.

In a further embodiment, the sealing arrangement of the drive unit can be designed to seal axially, with the two housing parts each having flange surfaces that are pressed together axially. The annular groove is open axially and is completely covered in the radial direction by the flange of the other housing part.

The drive unit particularly advantageously has an electric motor whose motor housing is sealed off from another adjacent housing part. The further housing part can be, for example, an electronics housing and/or a gearbox housing, which abuts on the motor housing by means of the sealing arrangement according to the disclosure. Such drive units can be used for the actuation of actuating drives or pumps or blowers or valves, especially in the area of motor vehicles, which are exposed to a corrosive surrounding.

BRIEF DESCRIPTION OF THE DRAWINGS

Exemplary embodiments of devices according to the disclosure are shown in the drawing and explained in more detail in the following description. Shown are.

DETAILED DESCRIPTION

Figure 1:
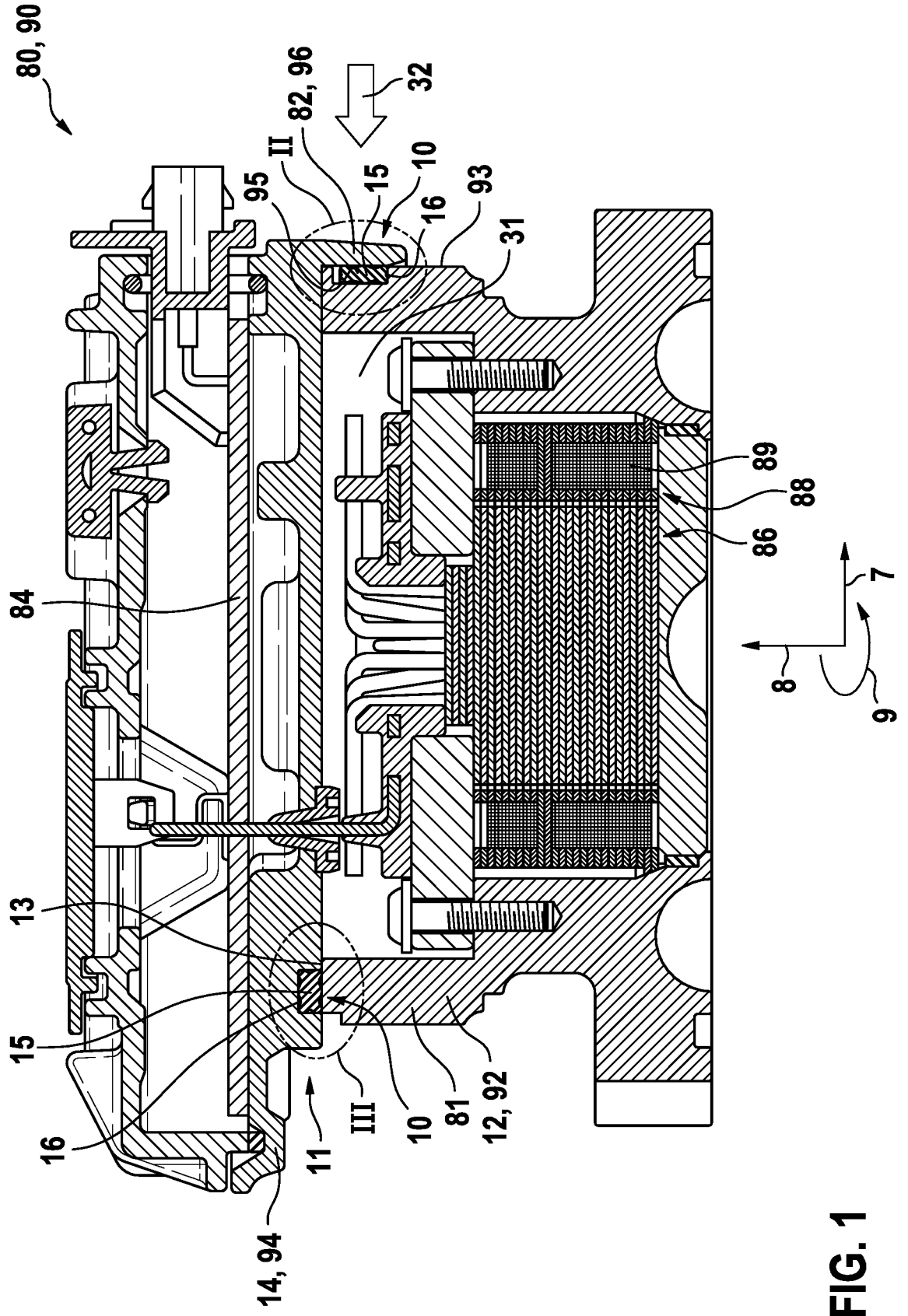
FIG. 1A cross-sectional view of a section of a drive unit according to the disclosure, and FIGS. 2 and 3 Exemplary embodiments of sealing arrangements of a drive unit.

In FIG. 1, a drive unit 80 is shown with a housing 11 having a first housing part 12 and a second housing part 14. For example, the first housing part 12 is formed as a motor housing 92 that houses a stator 88 and a rotor 86. The second housing part 14 is formed here, for example, as an electronics housing 94 which closes off the motor housing 92 in the axial direction 8. The electronics housing 94 preferably accommodates an electronic circuit board 84 in which the control of an electrical winding 89 of the stator 88 is implemented. Here, the first housing part 12 has a first cylindrical end 81 against which a second cylindrical end 82 of the second housing part 14 abuts. A sealing arrangement 10 is formed between the two housing parts 12, 14, which is designed as a radial seal on the right side in FIG. 1. In this case, an annular groove 16 open in the radial direction 7 is formed on a cylindrical circumferential wall 93 of the motor housing 92 and accommodates a sealing ring 15. The second housing part 14 has an axial annular wall 96 at its cylindrical end 82, which covers the annular groove 16 in the axial direction 8. Such a radial seal is shown enlarged in FIG. 2. On the left side of FIG. 1, another embodiment of the sealing arrangement 10 is shown as an axial seal, in which the annular groove 16 is open in the axial direction 8. For example, the annular groove 16 is formed at the cylindrical end 82 of the second housing part 14 and receives the sealing ring 15 as an axial seal ring. This design is shown enlarged in FIG. 3.

Figure 2:
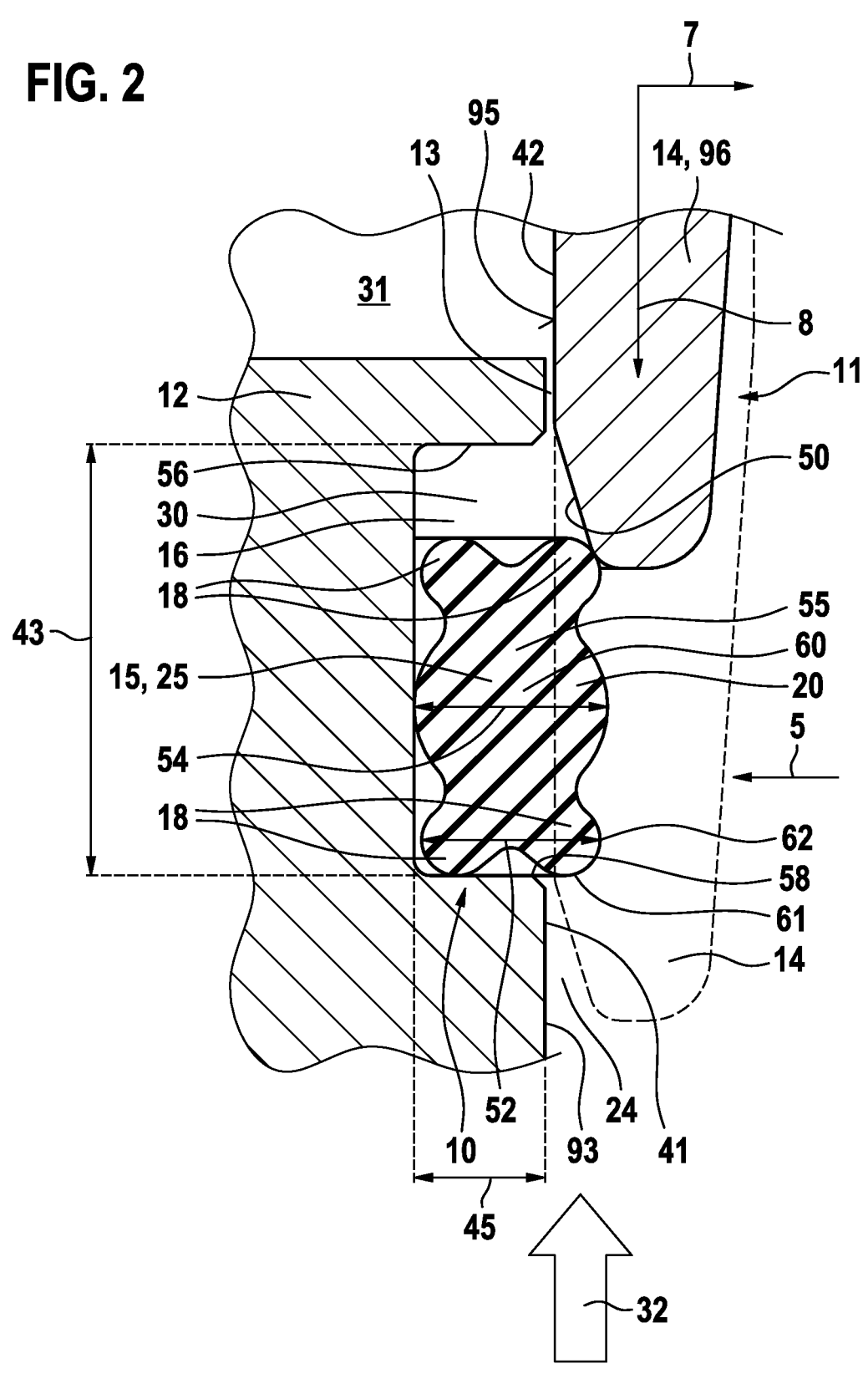

FIG. 2 shows the enlarged view of the radial seal according to II in FIG. 1. The radially open annular groove 16 is formed in the cylindrical end 81 of the first housing part 12. The annular groove 16 has a profile 56 that is approximately rectangular in shape. The profile 56 has an extension 43 transverse to the sealing direction 5 that is greater than an extension 45 of the profile 56 in the sealing direction 5. The second housing part 14 is pushed on here in axial direction 8 from above over the annular groove 16. In this embodiment, the second housing part 14 has the circumferential axial annular wall 96, the cylindrical inner surface 95 of which abuts on the sealing ring 15 in a radially sealing manner. A joint gap 13 is formed between the first and second housing parts 12, 14, which runs transversely to the sealing direction 5 along which the sealing ring 15 is pressed into the annular groove 16. An insertion chamfer 50 is formed on the second housing part 14, which is pushed in the axial direction 8 over the sealing ring 15 inserted in the annular groove 16. In the process, the insertion chamfer 50 presses the ring seal 15 into the annular groove 16 in the sealing direction 5, while the second housing part 14 is pushed over the annular groove 16 in the axial direction 8. In FIG. 2, the final assembled position of the second housing part 14 is shown as a dashed line. Here, the beginning of the insertion chamfer 50 in FIG. 2 is arranged exactly at the lower right corner 58 of the annular groove 16. Starting from the annular groove 16, a widening 24 of the second housing part 14 is thereby formed on a first side 41 adjacent to the annular groove 16 by the insertion chamfer 50. This widening 24 allows better ventilation and drying of the annular groove 16. Thus, crevice corrosion can be prevented on this first side 41, which is open to the outside of the surrounding 32. In the fully assembled state of the second housing part 14 (shown dashed), the sealing ring 15, on the one hand, is in sealing contact with the O-ring 20 in the central area 60 of the sealing ring 15 in the radial direction 7 on both housing parts 12, 14 on the opposite side. Here, the sealing ring 15 has a cross-section 54 from whose central area 60, which is formed as an O-ring 20, four sealing ears 18 extend into the respective corners 58 of the profile 56 of the annular groove 16. In this case, the sealing ear 18, which is arranged in the lower right of the annular groove 16 in FIG. 2, rests with a first ear area 61 axially at the bottom against the first housing part 12, and with a second ear area 62 radially against the second housing part 14. Thus, this sealing ear 18 seals the opening at the annular groove 16 formed by the widening 24 in a fluid-tight manner. Along the joint gap 13, the sealing ring 15 successively abuts both the first housing part 12 and the second housing part 14 with three sealing areas. In the central area 60, the O-ring 20 causes a primary sealing area with the effect of pressure activation, and at the two end areas of the sealing ring 15, the sealing ears 18 opposite each other in pairs form further second and third sealing lips. Thus, the penetrating liquid must overcome three sealing areas in the direction along the joint gap 13 in order to reach the interior 31 of the housing 11. In FIG. 2, in the unloaded state of the sealing ring 15, a cavity 30 is still formed next to it in the annular groove 16. After the second housing part 14 has been completely assembled, the sealing ring 15 is pressed into the annular groove 16 to such an extent that the cavity 30 is largely filled, for example, by the cross-section 55 of the sealing ring 15. In the unloaded state, the diameter 54 in the area of the O-ring 20 in the central area 60 is approximately equal to a distance 52 between the two outer ear areas 62 of the sealing ring 15 in the sealing direction 5. As a result, the sealing ring 15 in the fully pressed-in state then also lies with three sealing areas arranged next to each other on the first and second housing parts 12, 14 respectively.

Figure 3:
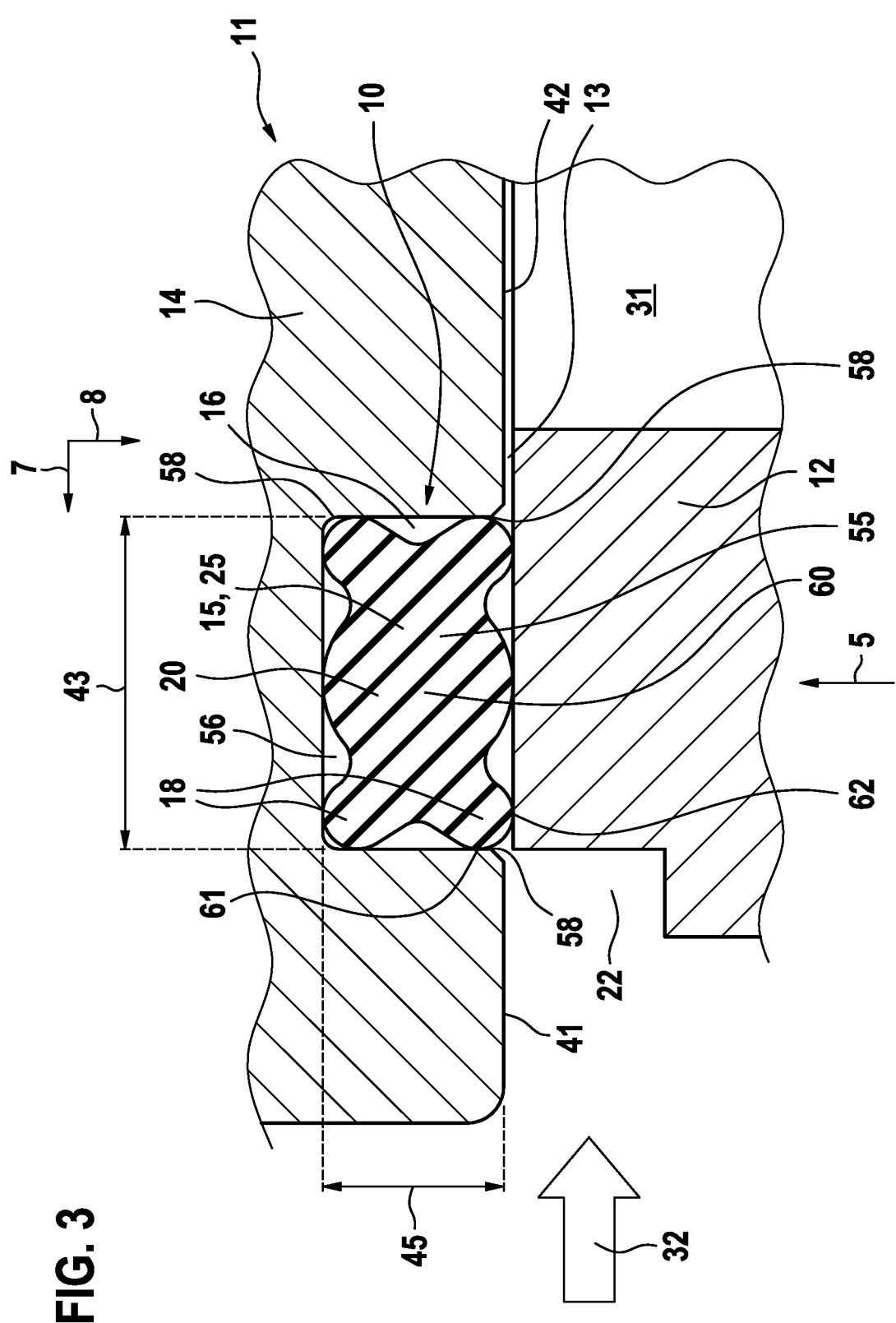

In FIG. 3, the sealing ring 15 is shown in a fully pressed-in state according to the design of the axial seal corresponding to III in FIG. 1. In this embodiment, the sealing direction 5 is arranged in the axial direction 8 along the motor axis. The annular groove 16 is formed here, for example, in the second housing part 14, which in FIG. 1 is formed, for example, as an electronics housing 94. The second housing part 14 completely covers the annular groove 16 in the radial direction 7. On the first side 41 radially towards the surrounding 32, a free space 22 is formed here, which in FIG. 3 extends to the lower left corner 58 of the annular groove 16. This ensures good ventilation and drying of the annular groove 16. The fully pressed-in sealing ring 15 in turn rests on the one hand with its central area 60 as an O-ring 20 against the housing parts 12, 14 on the opposite side. Adjacent to the central area 60, four sealing ears 18 are again formed here on the cross-section 55 of the sealing ring 15. The sealing ear 18 shown in FIG. 3, bottom left, here rests with the first ear area 61 on the second housing part 14, and with the second ear area 62 on the first housing part 12. Thus, the annular groove 16 is sealed towards the free space 22, where no joint gap 13 is formed on the first side 41, by means of this sealing ear 18. On the opposite side 42 of the annular groove 16 in the radial direction 7, the joint gap 13 is formed between the two housing parts 12, 14 and extends to the interior 31 of the housing 11. Even in the fully assembled state, it can be seen that the sealing ring 15 has three sealing areas—arranged along the joint gap 13—which abut on the two housing parts 12, 14 on the opposite side respectively. The profile 56 of the annular groove 16 is largely filled by the cross-section 55 of the sealing ring 15, preferably at least 65% of the groove profile 56. The sealing ring 15 is made, for example, from an elastomer as an injection-molded part and is designed to be compressible with respect to the sealing direction 5. To assemble the housing 11, the sealing ring 15 is inserted into the annular groove 16 in the first and/or second housing part 12, 14 so that the sealing ring 15 completely surrounds the rotor 86 and the stator 88 of the drive unit 80 according to FIG. 1. The next housing part 14, 12 is then pressed against the sealing ring 15 and the two housing parts 12, 14 are joined together by means of connecting means.

It should be noted that with regard to the exemplary embodiments shown in the figures, a wide variety of possible combinations of the individual features with one another are possible. For example, the specific design of the sealing ring 15 with the sealing ears 18, as well as the annular groove 16, can be adapted to the corresponding application. The sealing ring 15 operates on the principle of pressure activation, as with a fully circumferential O-ring. The sealing ears 18 formed on the central O-ring area form a cross-section corresponding to a "rubber bear" with the central O-ring belly and the sealing ears 18 or sealing legs formed thereon, which seal the groove corners 58 in particular. Preferably, the sealing arrangement 10 according to the disclosure is used in an electric motor drive unit 80 having a gear interface to a gear component or an interface to an adjacent electronics housing 94 or a pump housing or a valve housing or a blower housing or a compressor housing. For example, such a drive unit 80 is used to adjust moving parts, or to drive a pump or a compressor, especially for hydrogen.

The invention claimed is:

1. A sealing arrangement for sealing a first housing part with respect to a second housing part abutting thereon, the sealing arrangement comprising:
   a sealing ring arranged in an annular groove between the first and second housing parts, the sealing ring having a cross-section defining:

a central area that abuts the first and second housing parts on opposite sides as an O-ring; and
   at least two sealing ears extending from the central area of the cross-section into corners of the annular groove.

2. The sealing arrangement according to claim 1, wherein the at least two sealing ears include exactly four sealing ears extending symmetrically from the central area of the cross-section into all four corners of a rectangular profile of the annular groove.

3. The sealing arrangement according to claim 1, wherein at least one of the at least two sealing ears abuts on the first housing part with a first ear area and the second housing part with a second ear area.

4. The sealing arrangement according to claim 1, wherein, in an unloaded state of the sealing ring, a diameter of the cross-section at the central area of the O-ring in a sealing direction is approximately equal to a distance between two outer ear areas of two sealing ears of the at least two sealing ears that are opposite each other in the sealing direction.

5. The sealing arrangement according to claim 1, wherein the sealing ring is an elastic injection-molded part.

6. The sealing arrangement according to claim 1, wherein a joint gap is formed transversely to a sealing direction between the first and second housing parts, and a profile of the annular groove has a greater extent in a direction of the joint gap than an extension of the profile in the sealing direction.

7. The sealing arrangement according to claim 6, wherein the joint gap extends only on one side of the annular groove transversely to the sealing direction, and a free space or a widening is formed on an opposite side of the annular groove between the first and second housing parts in the sealing direction.

8. The sealing arrangement according to claim 7, wherein the free space or the widening extends from one side transversely to the sealing direction precisely as far as the annular groove, and a sealing ear abuts in a sealing manner precisely on a corner of the annular groove both on the first and in the second housing part, so as to prevent moisture from penetrating via the free space or the widening.

9. The sealing arrangement according to claim 7, wherein the free space or the widening is formed as an insertion chamfer on the first housing part or the second housing part, the insertion chamfer pressing the sealing ring into the annular groove in the sealing direction when the first and second housing parts are joined.

10. The sealing arrangement according to claim 1, wherein the cross-section of the sealing ring fills the profile of the annular groove in the assembled state more than 60% so as to reduce cavities in the annular groove.

11. A drive unit comprising:
   a first housing part configured as a motor housing;
   a second housing part adjoined to the first housing part, the second housing part being configured as an electronics housing, a gearbox housing, a pump housing, a valve housing, a blower housing, or a compressor housing, wherein the first and second housing parts each have an approximately cylindrical end; and
   a sealing arrangement comprising:
      a sealing ring arranged in an annular groove between the first and second housing parts, the sealing ring having a cross-section defining:
         a central area that abuts the first and second housing parts on opposite sides as an O-ring; and at least two sealing ears extending from the central area of the cross-section into corners of the annular groove.

12. The drive unit according to claim 11, wherein:

the sealing arrangement is configured as a radial seal with respect to a motor axis, the annular groove is radially open on at least one of the first and second housing parts, and the sealing ring abuts on the first and second housing parts in a radially sealing manner in a radial direction relative to the motor axis.

13. The drive unit according to claim 11, wherein:

the sealing arrangement is configured as an axial seal with respect to a motor axis, the annular groove is axially open on at least one of the first and second housing parts, and the sealing ring abuts on the first and second housing parts in an axially sealing manner in a direction of the motor axis.

14. The drive unit according to claim 11, wherein:

the annular groove is defined in a cylindrical circumferential surface of the motor housing, and the second housing part has, in an axial direction, an annular wall with a cylindrical inner surface which is pushed in the axial direction over the annular groove, and an insertion chamfer, via which the sealing ring is pressed into the annular groove in a radial direction, is formed on the cylindrical inner surface.

15. The sealing arrangement according to claim 5, wherein the sealing ring is formed from an elastomer.

16. The sealing arrangement according to claim 10, wherein the cross-section of the sealing ring fills the profile of the annular groove in the assembled state more than 70%.

17. The drive unit according to claim 11, wherein the drive unit is an electric motor.

18. The sealing arrangement according to claim 2, wherein:

a first side of the cross-section includes three first contact regions in contact with the first housing part, each of the three first contact regions being spaced apart from one another, and a second side of the cross-section that is opposite the first side in a sealing direction includes three second contact regions in contact with the second housing part, each of the second contact regions being spaced apart from one another.

19. The sealing arrangement according to claim 18, wherein the central area forms a central one of the three first contact regions and a central one of the three second contact regions, and each of the remaining first contact regions and second contact regions is formed by one of the exactly four sealing ears.

20. The drive unit according to claim 11, wherein:

a first side of the cross-section includes three first contact regions in contact with the first housing part, each of the three first contact regions being spaced apart from one another, and a second side of the cross-section that is opposite the first side in a sealing direction includes three second contact regions in contact with the second housing part, each of the second contact regions being spaced apart from one another.

* * * * *